United States Patent
Griffith et al.

[11] Patent Number: 5,891,238
[45] Date of Patent: Apr. 6, 1999

[54] CURABLE PIGMENTED SILICATE COMPOSITIONS

[75] Inventors: Gary J. Griffith, Fort Thomas; Roger A. Wallace, Crittenden, both of Ky.

[73] Assignee: AOS Holding Company, Wilmington, Del.

[21] Appl. No.: 998,949

[22] Filed: Dec. 29, 1997

Related U.S. Application Data

[60] Provisional application No. 60/058,129 Sep. 8, 1997.

[51] Int. Cl.⁶ .............. C04B 12/04; C09D 1/02
[52] U.S. Cl. ............ 106/635; 106/600; 106/636; 106/286.2; 106/286.5; 106/286.3; 106/286.6; 106/286.7; 106/287.1; 106/287.17; 428/426; 428/428; 428/432
[58] Field of Search .................. 106/600, 635, 106/636, 286.2, 286.3, 286.5, 286.6, 286.7, 287.1, 287.17; 428/426, 428, 432

[56] References Cited

U.S. PATENT DOCUMENTS

| | | | |
|---|---|---|---|
| 3,620,791 | 11/1971 | Krupnick | 106/288 B |
| 3,687,885 | 8/1972 | Abriss et al. | 260/29.6 WB |
| 4,170,461 | 10/1979 | Breininger et al. | 65/60 D |
| 4,172,110 | 10/1979 | Caesar et al. | 264/109 |
| 4,219,358 | 8/1980 | Hayashi et al. | 106/623 |
| 4,225,649 | 9/1980 | Peterson | 428/383 |
| 4,304,605 | 12/1981 | Keibler | 106/635 |
| 4,339,257 | 7/1982 | Ueda | 65/60.5 |
| 4,404,030 | 9/1983 | Komura et al. | 106/628 |
| 4,444,937 | 4/1984 | Badertscher | 524/425 |
| 4,608,087 | 8/1986 | Yoshino et al. | 106/626 |
| 4,617,206 | 10/1986 | Haisma et al. | 427/374.1 |
| 4,792,357 | 12/1988 | Bier | 106/83 |
| 4,803,400 | 2/1989 | Peters et al. | 313/489 |
| 4,806,389 | 2/1989 | Peters et al. | 427/67 |
| 5,090,983 | 2/1992 | Boaz | 65/25.4 |
| 5,091,003 | 2/1992 | Boaz | 106/20 |
| 5,120,570 | 6/1992 | Boaz | 427/45.1 |
| 5,151,215 | 9/1992 | Sigai | 252/301.6 F |
| 5,166,255 | 11/1992 | Anderson, Jr. et al. | 524/441 |
| 5,168,105 | 12/1992 | Anderson, Jr. et al. | 524/441 |
| 5,204,401 | 4/1993 | Anderson, Jr. et al. | 524/441 |
| 5,256,179 | 10/1993 | Crooker et al. | 65/60.2 |
| 5,262,464 | 11/1993 | Koevening et al. | 524/413 |
| 5,310,422 | 5/1994 | Abdel-Latif | 106/635 |
| 5,328,753 | 7/1994 | Boaz | 428/210 |
| 5,332,432 | 7/1994 | Okubi et al. | 106/631 |
| 5,422,143 | 6/1995 | Yiu | 427/397.8 |
| 5,445,754 | 8/1995 | Nelson | 252/62 |
| 5,518,535 | 5/1996 | Boaz | 106/38.3 |
| 5,532,292 | 7/1996 | Wainwright et al. | 523/179 |
| 5,562,949 | 10/1996 | Steele et al. | 427/397.7 |
| 5,582,920 | 12/1996 | Boaz | 428/428 |
| 5,593,492 | 1/1997 | Schaffer et al. | 106/623 |
| 5,660,893 | 8/1997 | Boaz | 427/542 |
| 5,677,064 | 10/1997 | Boaz | 428/426 |

OTHER PUBLICATIONS

CA 122:317591, Tanabe et al., "Compositions for formation of inorganic coatings", corresponds to JP 6336559 A2, Dec. 1994.

*Primary Examiner*—Michael Marcheschi
*Attorney, Agent, or Firm*—Michael Best & Friedrich LLP

[57] ABSTRACT

A water-based inorganic coating formulation that contains no lead, and no organic matters, and provides for better control of the viscosity, the stability, the material separation, the homogeneity, and the re-crystallization properties of the formulation. This improved water-based inorganic coating formulation includes a water-based alkaline metal silicate solution, a pigment, and colloidal alumina dispersed within the coating formulation.

23 Claims, 1 Drawing Sheet

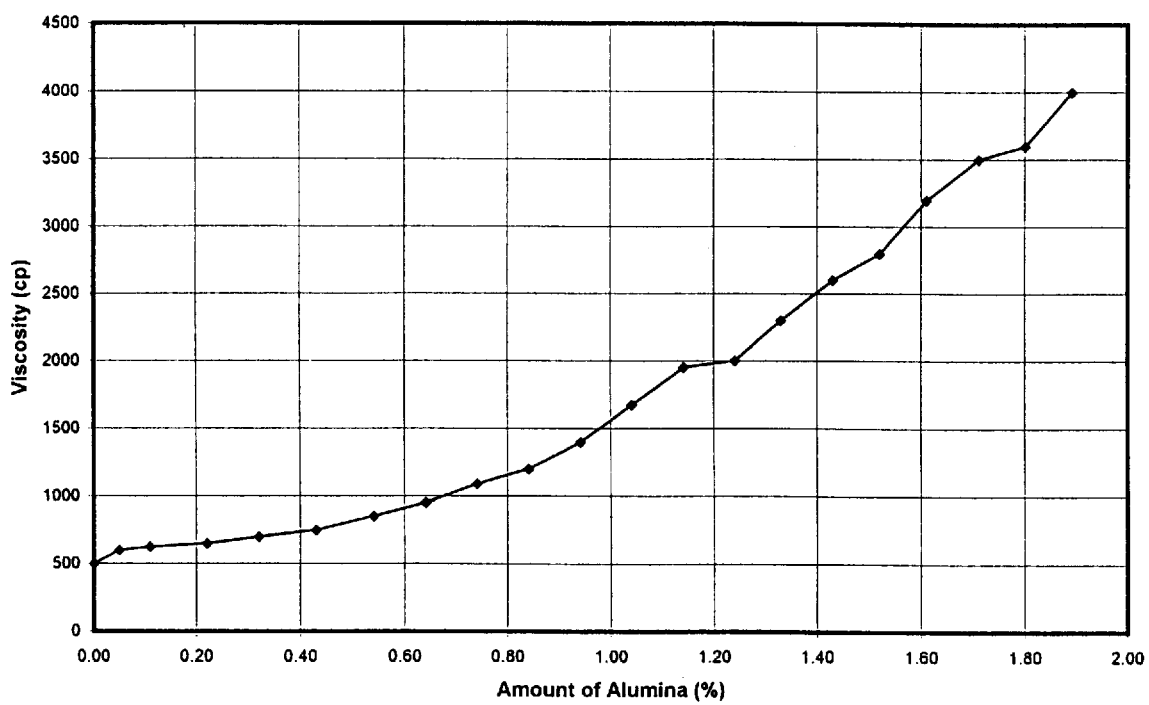

CURABLE PIGMENTED SILICATE COMPOSITIONS

This application claims the benefit of U.S. Provisional patent application Ser. No. 60/058,129 filed Sep. 8, 1997.

FIELD OF THE INVENTION

The present invention relates to curable, water-based, inorganic compositions, and more particularly to water-based inorganic coating substrates that contain an alkali metal based solution and a pigment.

BACKGROUND PRIOR ART

Numerous coatings have been used by skilled artisans for years as colorants and opacifiants for architectural, appliance, and automotive glass. Such coatings usually involve ceramic frit compositions that are composed of a mixture of metal oxides in an organic-based medium. The organic-based medium often includes materials such as pine oils, mineral oils, and other petroleum-based products. Such organic based coatings, however, give rise to numerous environmental and commercial concerns. Additionally, the metal oxide used in many such organic based compositions is lead oxide. Lead requires special care and handling during coating processes and in disposal, and is currently prohibited in paint formulations by United States Environmental Protection Agency regulations. Other metal oxides, such as cadmium and chromium, can also be added as pigments in such organic-based coatings, but are also considered hazardous. It is desirable to provide a water-based coating to take the place of such organic based and toxic material containing coatings.

Inorganic coating composition containing no lead and including water based alkali metal silicate solutions, pigments, and other components are known, for example, the coating compositions disclosed by U.S. Pat. No. 5,518,535 to Boaz and U.S. Pat. No. 5,510,188 to Vockler. However, it is often a problem to maintain control of the viscosity of such known coating solutions. The lack of control of the viscosity can lead to either viscosity build-up or running or blurring of the coating material. It is also a problem in such coatings to maintain consistent viscosity properties within a coating mixture.

Additionally, such known coating formulations often have difficulty with lack of stability and homogeneity. Often the materials suspended in the formulation will separate out in a short period of time such that the formulations are not homogeneous, and have re-crystallization problems. Each of these problems results in the coating formulations being difficult to use and having a shortened shelf life.

It is desirable to provide a water-based inorganic coating formulation that also provides for better control of the viscosity, the homogeneity, the re-crystallization, the stability, and the material separation properties of the formulation.

SUMMARY OF THE INVENTION

One object of this invention is to provide an improved inorganic, water-based coating material.

Another object of the invention is to provide an inorganic, water-based coating material having improved viscosity controllability.

Another object of the invention is to provide an inorganic, water-based coating material having better homogeneity controllability.

Another object of the invention is to provide an inorganic, water-based coating material having better stability and longer shelf life.

This invention pertains to a water-based inorganic coating formulation that contains no lead, and no organic matters, and provides for better control of the viscosity, the stability, the material separation, the homogeneity, and the re-crystallization properties of the formulation. This improved water-based inorganic coating formulation comprises: a water-based alkaline metal silicate solution; a pigment; and colloidal alumina dispersed within the coating formulation.

The use of the alumina component in the coating formulation provides for the control of the viscosity of the formulation, and the stability of the formulation. As a result of the use of the alumina, the formulation is more stable, and the problems of material separation and re-crystallization are minimized.

Especially important is the increased control of the viscosity of the formulation. Viscosity plays a key role during the application of such coating formulations. The viscosity of the material may be changed by changing the concentration of alumina within the formulation. By using alumina to control the viscosity of the formula, it enables the formulation to be useable for many applications.

The invention is a formulation with excellent shelf life that reduces the difficulties of viscosity build-up and material separation and re-crystallization. The formulation can be used by itself as an inorganic coating with good adhesion properties, good UV resistance properties, and good temperature resistant properties.

The formulation can also be used as a base material to which can be added frits or other oxides by users to custom design the material for special needs. The formulation can be mixed with finely divided electrically conductive material to form conductive films on glass or ceramic substances. Additionally, after curing, the formulation can be recoated with conductive materials such as those used in defogging automotive glass.

The formulation produces stronger bisque strengths or green strengths than organic coatings due to the strong cohesive and adhesive strength created by the formulation prior to curing. After curing, the formulation has excellent adhesive and cohesive properties as well as excellent water resistance.

One embodiment of the invention provides a water-based inorganic coating composition including water-based alkali metal silicate solution including water and a water-soluble alkali metal silicate. The coating includes an inorganic pigment selected from the group consisting of metal oxides, spinel series minerals, and mixtures thereof forming less than about 60 weight percent of the total composition. The composition includes colloidal alumina forming from about 0.5 to about 15 weight percent of the total composition, wherein the alumina increases the viscosity of the total composition and reduces the amount of separation of the pigment in the total composition over time.

Another embodiment of the invention includes the coating composition including water comprising from about 5 to about 60 weight percent of the total composition. Water-soluble sodium silicate comprises from about 10 to about 50 weight percent of the total composition. Inorganic pigment is selected from the group consisting of metal oxides, spinel series minerals, and mixtures thereof, and forms less than about 60 weight percent of the total composition. Colloidal alumina forms from about 0.5 to about 15 weight percent of the total composition, and the alumina increases the viscosity of the total composition and reduces the amount of separation of the pigment in the total composition over time.

Another embodiment of the invention includes the colloidal alumina comprising from about 0.75 to about 12 weight percent of the total composition.

Other features and advantages of the invention will become apparent to those skilled in the art upon review of the following detailed description and claims.

Before embodiments of the invention are explained in detail, it is to be understood that the invention is not limited in its application to the details of the composition and concentration of components set forth in the following description. The invention is capable of other embodiments and of being practiced or being carried out in various ways. Also, it is understood that the phraseology and terminology used herein is for the purpose of description and should not be regarded as limiting.

BRIEF DESCRIPTION OF THE DRAWINGS

FIG. 1 is a graph showing the relationship between the viscosity and the weight percent of alumina in one embodiment of the invention.

DETAILED DESCRIPTION OF AN EMBODIMENT

The present invention provides a water-based inorganic coating composition including: a water based alkali metal silicate solution; a pigment; and colloidal alumina. The new composition including alumina provides for better control of viscosity, homogeneity, and therefore the stability and adhesion properties of the formulation as compared to other known formulations.

The water-based alkali metal silicate solutions generally comprise from about 30 to about 85 weight percent of the total composition. This amount is preferably from about 35 to about 60 weight percent, and more preferably, from about 40 to about 50 weight percent of the total composition. As used herein, "weight percent" of the total composition means a fraction of the total weight of the composition.

The water-based alkali metal silicate solutions include water-soluble alkali metal silicates, and water. The alkali metal silicates are preferably selected from the group consisting of sodium silicates, potassium silicates, lithium silicates, and mixtures thereof. More preferably, alkali metal silicate is selected from the group consisting of sodium silicates, potassium silicates, or mixtures thereof, and most preferable, is a sodium silicate.

The alkali metal silicates comprise from about 10 to about 50 weight percent of the total coating composition, preferably from about 11 to 36, and more preferably from about 15 to about 25 weight percent of the total coating composition. Water makes up from about 5 to about 60 weight percent of the total coating composition, preferably from about 15 to about 55, and more preferably from about 25 to about 35 weight percent of the total coating composition.

The preferred sodium silicates useful in the present invention can be generally represented by the formula $SiO_2:Na_2O$. The weight ratio of $SiO_2$ to $Na_2O$ in the present invention ranges from about 2:1 to about 4:1, and preferably from about 2:1 to about 3:1. Preferred sodium silicate solutions are commercially available from the PQ Corporation at P.O. Box 840, Valley Forge, Pa. 19482. These solutions include:
PQ® STIXSO® (Wt. Ratio $SiO_2:Na_2O=3.25$);
PQ® N® (Wt. Ratio $SiO_2:Na_2O=3.22$);
PQ® E® (Wt. Ratio $SiO_2:Na_2O=3.22$);
PQ® O® (Wt. Ratio $SiO_2:Na_2O=3.22$);
PQ® K® (Wt. Ratio $SiO_2:Na_2O=2.88$);
PQ® M® (Wt. Ratio $SiO_2:Na_2O=2.58$);
PQ® STAR® (Wt. Ratio $SiO_2:Na_2O=2.50$);
PQ® RU® (Wt. Ratio $SiO_2:Na_2O=2.40$);
PQ® D® (Wt. Ratio $SiO_2:Na_2O=2.00$);
PQ® C® (Wt. Ratio $SiO_2:Na_2O=2.00$); and
PQ® STARSO® (Wt. Ratio $SiO_2:Na_2O=1.80$).

Of these solutions, the PQ® STARSO® having a weight ratio of $SiO_2:Na_2O=1.80$, and including about 37.5% $SiO_2/Na_2O$ by weight of the total solution is most preferred.

The pigment may be of any type and in any form that is compatible with the composition and is useful for the desired purposes of pigmentation. The pigment should be capable of withstanding the curing temperatures used for a particular application, and capable of pigmenting or rendering opaque the composition as desired.

Preferred pigments are inorganic pigments selected from the group consisting of metal oxides, spinel series minerals, clays and mixtures thereof. Preferable metal oxides include those selected from the group consisting of oxides of copper, iron, nickel, cobalt, manganese, chromium, titanium, zinc and mixtures thereof. Preferable spinel series minerals are selected from the group consisting of spinel ($Mg(Al_2O_4)$), hercynite ($Fe(Al_2O_4)$), gahnite ($Zn(Al_2O_4)$), galaxite ($Mn(Al_2O_4)$) and mixtures thereof. Copper oxide, manganese oxide, spinel series minerals, and mixtures thereof are the most preferred.

The pigments may be admixed with the other ingredients in the form of a dry powder or flake, or in an aqueous dispersion. Additionally, it is believed that the combination of one or more metal oxide pigments along with the alumina, rather than use of a single oxide, increases the shelf life of the composition.

The pigments generally comprise less than about 60 weight percent of the total composition, depending upon the desired amount of pigmentation. Preferably, the pigment comprises from about 35 to about 55, and more preferably from about 40 to about 50 weight percent of the total composition.

The alumina (aluminum oxide) is mixed into the formulation to form a colloidal dispersion of alumina. As used herein, the term "colloidal alumina" means alumina having a particle size which causes the formation of a colloidal dispersion when added to an aqueous solution. Preferably, the particle size of the colloidal alumina is between about 1 and about 200 nanometers. More preferably, the particle size of the colloidal alumina is between about 40 and about 180 nanometers.

Preferably, the colloidal alumina comprises from about 0.50 to about 15 weight percent of the total composition. More preferably, the colloidal alumina comprises from about 0.75 to about 12, and most preferably from about 3 to about 7 weight percent of the total composition.

The amount of colloidal alumina added provides for a method of controlling the viscosity of the formulation, which is vitally important in the application of such coating formulations. Generally, as more alumina is added, the coating solution becomes more viscous. When the alumina makes up less than about 0.75 weight percent of the total coating solution, an increase in the weight percent of alumina the total solution has a relatively small increase upon the viscosity of the solution. Generally, for coating solutions having less than 0.75 weight percent alumina in the total solution, about a 1% increase of the weight percent of alumina results in less than about a 1% increase in viscosity.

In coating solutions containing above about 0.75 weight percent alumina, the relationship between the viscosity of the coating solution and the weight percent of alumina in the solution is generally linear. Generally, about a 1% increase in the weight percent of alumina results in between about a 1.0% and about a 2.0% increase in viscosity. In some embodiments, a 1% increase in weight percent alumina results in about a 1.2% to about a 1.8% increase in viscosity; and in even other embodiments, a 1% increase in weight percent alumina results in an increase of about 1.4% to about 1.75% in viscosity.

Additionally, the colloidal alumina acts as a suspending agent and provides for homogeneity, and reduces the separation of the components in the formulation over time. Below a weight percent of about 0.75 of the total composition, the alumina has a relatively small effect as a suspending agent. Above a weight percent of about 0.75 of the total composition, alumina is a very effective suspending agent. Therefore, it is preferable to include above about 0.75 weight percent of alumina in the total coating solutions of the present invention for better homogeneity and stability.

Colloidal alumina suitable for use in the present invention is marketed under the brand name DISPAL by Condea Vista at 900 Threadneedle, Houston, Tex., 77079. Suitable DISPAL products include DISPAL 11N7 Series, DISPAL 14N4 Series, DISPAL 18N4 Series, and DISPAL 23N4 Series products. Preferably, the Condea Vista product named DISPAL 14N4 is used as the source of alumina. The alumina may be added in a dry powder form, or may be in a stable, colloidal dispersion in water.

The coating composition may also include conventional additional components. Components such as frits or silicon dioxide may be added to the composition to adjust the thermal expansion properties. Additionally, thermally refractory materials may be added to the composition. Also, a water soluble base may be employed to provide the paint composition with a desired pH.

Additionally, the formulation can be used as a base material to which can be added frits or oxides by users to custom design the material for special needs. Frits may include ground glass or finely ground inorganic minerals. The formulation can also be mixed with finely divided electrically conductive material to form conductive films on glass or ceramic substances. Additionally, after curing, the formulation can be recoated with conductive materials such as those used in defogging automotive glass.

A coating composition of the present invention can be prepared in a ball mill. All of the ingredients are added in the ball mill, and milled to a fineness of between about 0 and about 8 on the Hegman fineness scale. Preferably, the ingredients are milled until the fineness is between about 3 and about 7, and most preferably between about 5 and about 7 on the Hegman scale. The Hegman readings should be taken in accordance with ASTM procedure number D1210, or through other appropriate procedures as known by those skilled in the art.

The composition of the present invention can be applied to a substrate, such as glass, metal or a ceramic, through a broad variety of conventional application methods, including spraying, screen printing, roll coating, curtain coating, and flow coating are usable with this composition. The formulation of this invention is particularly beneficial for use in many of these application methods due to the controllability of the viscosity.

The following examples are intended to exemplify embodiments of the invention and are not to be construed as limitations thereof.

EXAMPLE 1

A composition embodying the present invention was produced by admixing the following materials in the following weight percentages of the total composition:
Sodium Silicate Solution (PQ STARSO): 44.92%
Copper Oxide: 42.97%
Manganese Oxide: 8.59%
Colloidal Alumina (DISPAL 14N4): 3.52%

The ingredients were added in a ball mill, and milled until the mixture has a fineness reading between about 5 and about 7 on the Hegman scale. The resulting composition provides a water-based, non-toxic composition that can be applied to glass, metal and ceramic substrates. The coating formulation provides a substantially homogeneous formulation that is relatively stable and minimizes material separation and re-crystallization problems. The shelf-life of the formulation is therefore increased.

EXAMPLE 2

In a comparative experiment, four coating compositions were produced. Three of the compositions embody the present invention, with each having a varying amount of colloidal alumina added thereto. The fourth, control composition was substantially identical to the first three compositions, but without the alumina component. Each of these compositions were produced by admixing the materials in the weights shown in Table 1, below, in a ball mill and milling them for about 120 minutes to a fineness of about 6.5 on the Hegman fineness scale. The Hegman readings in this and the other examples herein were taken in accordance with ASTM procedure number D1210, and through procedures as known by those skilled in the art.

TABLE 1

| INGREDIENTS | Control (No Alumina) | Embodiment 1 | Embodiment 2 | Embodiment 3 |
|---|---|---|---|---|
| Sodium Silicate Solution (PQ STARSO) | 750.0 grams | 750.0 grams | 750.0 grams | 750.0 grams |
| Pigment (Copper Oxide) | 660.0 grams | 660.0 grams | 600.0 grams | 600.0 grams |
| Colloidal Alumina (DISPAL 14N4) | 0.0 | 15.0 grams | 45.0 grams | 90.0 grams |
| TOTAL WEIGHT | 1410.0 grams | 1425.0 grams | 1395.0 grams | 1440.0 grams |
| Mill Time | 120 Min. | 120 Min. | 120 Min. | 120 Min. |
| Fineness on Hegman Scale | 6.5 | 6.5 | 6.5 | 6.5 |
| Viscosity at Production | 350 centipoise | 1300 centipoise | 1750 centipoise | 5650 centipoise |

The viscosity of each composition was tested soon after production, and is listed in Table 1. It is apparent that the increase of alumina concentration in embodiments 1, 2, and 3 results in significant increases in viscosity.

The compositions were then placed in containers, and were allowed to sit undisturbed for a period of time. After 24 hours of sitting time, the copper oxide pigment separated out of the control composition. However, embodiments 1, 2 and 3 showed little significant sign of separation. Embodiments 1, 2, and 3 were allowed to sit undisturbed for an additional 14 days and were again observed, and still no significant separation was apparent.

EXAMPLE 3

In another comparative experiment, four coating compositions were produced with the ingredients as shown in Table 2. Each of the compositions were produced by admixing the ingredients in the weights shown in Table 2 into a ball mill and milling them for 120 minutes. As listed in Table 2, twenty (20) grams of aluminum phosphate was added to composition B, twenty (20) grams of colloidal silica was added to composition C, and twenty (20) grams of zinc oxide was added to compositions D. The viscosity of each composition was tested immediately after production, and is listed in Table 2.

TABLE 2

COMPOSITIONS

| INGREDIENTS | Composition A | Composition B | Composition C | Composition D |
|---|---|---|---|---|
| Sodium Silicate Solution (PQ STARSO) | 750.0 grams | 750.0 grams | 750.0 grams | 750.0 grams |
| Copper Oxide | 660.0 grams | 660.0 grams | 660.0 grams | 660.0 grams |
| Aluminum Phosphate (FAB 748) | 0.0 | 20.0 | 0.0 | 0.0 |
| Colloidal Silica (AEROSIL R-972) | 0.0 | 0.0 | 20.0 | 0.0 |
| Zinc Oxide | 0.0 | 0.0 | 0.0 | 20.0 |
| TOTAL WEIGHT | 1410.0 grams | 1430.0 grams | 1430.0 grams | 1430.0 grams |
| Mill time | 120 min. | 120 min. | 120 min. | 120 min. |
| Fineness on Hegman Scale | 6.5 | 6.25 | 6 | 6.25 |
| Viscosity at Production | 500 centipoise | 700 centipoise | 600 centipoise | 1050 centipoise |

At the time of production, it is observed that each of the compositions B through D showed an increase in viscosity due to the addition of the twenty grams of one of the aluminum phosphate, the colloidal silica, and the zinc oxide, respectfully. However, in comparing the viscosity results shown in Table 2 with the viscosity results shown in Table 1, it is also apparent that 15 grams of alumina had a greater effect upon the viscosity of a coating solution than 20 grams of any of the other materials tested.

Additionally, compositions B through D were then placed in containers, and were allowed to sit undisturbed for a period of time. A high level of separation of the pigment components in all of compositions B through D appeared within 14 days of the preparation of the compositions. These results can be directly compared to Embodiments 1, 2, and 3 from Example 2, above, where there was no significant separation over the same period of time in the solutions containing alumina.

Composition A from Example 3 was separated into two portions soon after being produced. The first portion of composition A was allowed to sit undisturbed. The second portion of composition A, measuring about 430 grams, was used to test the effect of adding small increments of colloidal alumina upon the viscosity of the coating solution.

DISPAL 23N4-20, which is a 20% alumina solution marketed by Condea Vista, was added and blended with the second portion of composition A in one to two milliliter increments. After each increment, the weight percent of alumina in the total composition was computed and the viscosity of the coating composition was measured. The resulting data is shown below in Table 3.

TABLE 3

| MEASURED VISCOSITY OF THE COATING COMPOSITION (centipoise) | WEIGHT % OF ALUMINA ($Al_2O_3$) OF TOTAL COMPOSITION |
|---|---|
| 500 | 0.00 |
| 600 | 0.05 |
| 625 | 0.11 |
| 650 | 0.22 |
| 700 | 0.32 |
| 750 | 0.43 |
| 850 | 0.54 |
| 950 | 0.64 |
| 1090 | 0.74 |
| 1200 | 0.84 |
| 1400 | 0.94 |
| 1675 | 1.04 |
| 1950 | 1.14 |
| 2000 | 1.24 |
| 2300 | 1.33 |
| 2600 | 1.43 |
| 2800 | 1.52 |
| 3200 | 1.61 |
| 3500 | 1.71 |
| 3600 | 1.80 |
| 4000 | 1.89 |

As shown in Table 3, the response of the viscosity of the second portion of composition A to the addition of alumina to the coating composition is fairly linear. FIG. 1 is a graph showing the effect of increasing the weight percent of alumina upon the viscosity of the second portion of composition A. As can be seen in the graph, after a minimum amount of alumina of about 0.75 weight percent of the total composition was reached, for every 1% increase in the weight percent of alumina, the viscosity increased by about 1.4% to about 1.8%.

Both portions of composition A: the first portion having no alumina added thereto, and the second portion, now containing 1.89% by weight alumina, were then allowed to sit undisturbed for about 72 hours and studied for separation. The first portion, containing no alumina, showed a high degree of separation. The second portion, containing alumina, showed very little separation.

EXAMPLE 4

In another experiment, six lots of coating compositions, each lot of about 100 lbs., were produced with the ingredients and amounts as shown in Table 4. Each of the six compositions were produced by admixing the ingredients in the weight percent amounts shown in Table 4 into a ball mill and milling until the fineness reading of the composition was between about 6.0 and about 6.5 on the Hegman scale.

TABLE 4

| INGR. | |
|---|---|
| PQ STARSO sodium silicate solution | 44.92% |
| Copper Oxide | 42.97% |
| Mn Oxide | 8.59% |
| DISPAL 14N4 colloidal alumina | 3.52% |
| Total | 100% |

The six lots were then combined and mixed into one coating solution. The resulting coating solution had a viscosity of 5600 cps, and produced a smooth coating surface on glass without pinholes or cracking.

The single coating solution was then stored for four months, and then retested for viscosity, fineness, and coating performance. The stored coating had a viscosity of 4200 cps, read 5.5 to 6 on the Hegman fineness scale, and produced a smooth coating surface on glass without pinholes or cracking. The coating composition embodying the present invention remained relatively stable over an extended storage period. The good Hegman fineness reading shows a lack of recrystallization within the coating.

Various feature and advantages of the invention are set forth in the following claims.

We claim:

1. A water-based inorganic coating composition comprising:
  a water-based alkali metal silicate solution including water and a water-soluble alkali metal silicate;
  a pigment selected from the group consisting of metal oxides, spinel series minerals, and mixtures thereof; and
  colloidal alumina forming from about 0.5 to about 15 weight percent of the total composition, wherein said alumina increases the viscosity of the total composition and reduces the amount of separation of the pigment in the total composition during storage,
  wherein the coating composition is applied to a glass substrate.

2. The water based inorganic coating composition of claim 1 wherein:
  the water forms from about 5 to about 60 weight percent of the total composition; and
  the water-soluble alkali metal silicate forms from about 10 to about 50 weight percent of the total composition.

3. The water based inorganic coating composition of claim 2, wherein said water-soluble alkali metal silicate includes sodium silicate.

4. The water based inorganic coating composition of claim 1, wherein said water-soluble alkali metal silicate is selected from the group consisting of sodium silicate, potassium silicate, lithium silicate, and mixtures thereof.

5. The water based inorganic coating composition of claim 1 wherein said alumina forms from about 0.75 to about 12 weight percent of the total composition, and wherein about a 1% increase in the weight percent of alumina in the total composition results in between about a 1.2% and about a 1.8% increase in viscosity.

6. The water based inorganic coating composition of claim 1 wherein said metal oxide is selected from the group consisting of oxides of copper, manganese, iron, nickel, cobalt and mixtures thereof, and said spinel series mineral is selected from the group consisting of spinel (Mg(Al204)), hercynite (Fe(Al204)), gahnite (Zn(Al204)), galaxite (Mn(Al204)) and mixtures thereof.

7. A water-based inorganic coating composition comprising:
  a water comprising from about 5 to about 60 weight percent of the total composition;
  a water-soluble sodium silicate comprising from about 10 to about 50 weight percent of the total composition;
  pigment selected from the group consisting of metal oxides, spinel series minerals, and mixtures thereof, the pigment comprising from about 35 to about 60 weight percent of the total composition; and
  colloidal alumina forming from about 0.5 to about 15 weight percent of the total composition, wherein said alumina increases the viscosity of the total composition and reduces the amount of separation of the pigment in the total composition over time.

8. The water based inorganic coating composition of claim 7 wherein said alumina forms from about 0.75 to about 12 weight percent of the total composition such that a 1% increase in the weight percent of alumina results in from about a 1.2 to about a 1.8 increase in viscosity of the composition.

9. The water based inorganic coating composition of claim 8 wherein said colloidal alumina comprises from about 3 to about 7 weight percent of the total composition.

10. The water based inorganic coating composition of claim 7 wherein the sodium-silicate comprises from about 11 to about 36 weight percent of the total composition.

11. The water based inorganic coating composition of claim 7 wherein the pigment is selected from the group consisting of copper oxide, manganese oxide, spinel series minerals, and mixtures thereof.

12. A water-based inorganic coating composition comprising:
  water comprising from about 5 to about 60 weight percent of the total composition;
  water soluble sodium silicate forming from about 10 to about 50 weight percent of the total composition;
  a pigment selected from the group consisting of metal oxides, spinel series minerals, and mixtures thereof; and
  colloidal alumina comprising from about 0.75 to about 12 weight percent of the total compositions wherein the coating composition is applied to a glass substrate.

13. The water based inorganic coating composition of claim 12 wherein the water and the water soluble sodium silicate together comprise from about 35% to about 60% by weight of the total composition.

14. The water based inorganic coating composition of claim 12 wherein the weight ratio of $SiO_2$ to $Na_2O$ in the water soluble sodium silicate is from about 2:1 to about 4:1.

15. The water based inorganic coating composition of claim 12 wherein said metal oxides are selected from the group consisting of oxides of copper, iron, nickel, cobalt, manganese, chromium, titanium, zinc and mixtures thereof, and wherein said spinel series minerals are selected from the group consisting of spinel ($Mg(Al_2O_4)$), hercynite ($Fe(Al_2O_4)$), gahnite ($Zn(Al_2O_4)$), galaxite ($Mn(Al_2O_4)$) and mixtures thereof.

16. The water based inorganic coating composition of claim 12 wherein said pigment is selected from the group consisting of copper oxide, manganese oxide, spinel series minerals, and mixtures thereof.

17. The water based inorganic coating composition of claim 12 wherein the colloidal alumina has a particle size of between about 1 and about 200 nanometers.

18. The water based inorganic coating composition of claim 12 wherein the colloidal alumina comprises from about 3 to about 7 weight percent of the total composition.

19. A method of forming a water-based inorganic coating composition, wherein said composition is applied to a glass substrate comprising:
  providing a water-based alkali metal silicate solution including water and a water-soluble alkali metal silicate such that water comprises from about 5 to about 60 weight percent of the total composition and water-soluble sodium silicate comprising from about 10 to about 50 weight percent of the total composition;
  admixing into the solution a pigment selected from the group consisting of metal oxides, spinel series minerals, and mixtures thereof;

admixing colloidal alumina into the solution such that the alumina forms from about 0.5 to about 15 weight percent of the total composition and thereby increases the viscosity of the composition as the amount of alumina in the solution is increased.

20. The method of claim 19 wherein as the amount of colloidal alumina is increased, the rate of material separation of the solution over time is decreased.

21. The method of claim 19 wherein as the colloidal alumina is admixed into the solution, a 1% increase in the weight percent of alumina results in from about a 1.2 to about a 1.8 increase in viscosity of the composition.

22. The method of claim 19 wherein the pigment comprises from about 35 to about 60 weight percent of the coating composition.

23. The coating composition of claim 7 wherein the coating composition is applied to a glass substrate.

* * * * *